United States Patent
Hong et al.

(10) Patent No.: US 11,044,651 B2
(45) Date of Patent: Jun. 22, 2021

(54) METHOD AND APPARATUS FOR SUPPORTING CARRIER RESELECTION BASED ON CHANNEL BUSY RATIO IN WIRELESS COMMUNICATION SYSTEM

(71) Applicant: LG Electronics Inc., Seoul (KR)

(72) Inventors: Jongwoo Hong, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/841,340

(22) Filed: Apr. 6, 2020

(65) Prior Publication Data

US 2020/0236600 A1 Jul. 23, 2020

Related U.S. Application Data

(63) Continuation of application No. PCT/KR2018/011770, filed on Oct. 5, 2018.

(60) Provisional application No. 62/568,801, filed on Oct. 6, 2017.

(51) Int. Cl.
*H04W 36/06* (2009.01)
*H04W 72/04* (2009.01)

(52) U.S. Cl.
CPC ....... *H04W 36/06* (2013.01); *H04W 72/0453* (2013.01); *H04W 72/0486* (2013.01)

(58) Field of Classification Search
CPC ............. H04W 36/06; H04W 72/0486; H04W 72/0453; H04W 76/14; H04L 5/001; H04L 5/0098
See application file for complete search history.

(56) References Cited

U.S. PATENT DOCUMENTS

| | | | |
|---|---|---|---|
| 2016/0073312 A1* | 3/2016 | Sridhar | H04W 48/16 370/235 |
| 2017/0188391 A1 | 6/2017 | Rajagopal et al. | |
| 2017/0238321 A1 | 8/2017 | Sartori et al. | |
| 2018/0332564 A1* | 11/2018 | Lee | H04W 72/02 |
| 2019/0075548 A1 | 3/2019 | Lee et al. | |

(Continued)

FOREIGN PATENT DOCUMENTS

| | | |
|---|---|---|
| WO | WO17150959 | 9/2017 |
| WO | WO2017160070 | 9/2017 |
| WO | WO19064228 | 4/2019 |

OTHER PUBLICATIONS

Catt, "Carrier configuration and carrier selection in eV2X CA," R2-1708052, 3GPP TSG-RAN WG2 #99, Berlin, Germany, dated Aug. 21-25, 2017, 6 pages.

(Continued)

*Primary Examiner* — Hoang-Chuong Q Vu
(74) *Attorney, Agent, or Firm* — Fish & Richardson P.C.

(57) ABSTRACT

According to the present disclosure, a user equipment (UE) selects a carrier among a plurality of carriers, receives information on a channel busy ratio (CBR) threshold from a network, and triggers a carrier reselection. When a CBR of the carrier satisfies the CBR threshold, e.g. the CBR of the carrier is below than the CBR threshold, the UE keeps using the carrier. That is, the carrier reselection is not performed when the CBR of the carrier satisfies the CBR threshold. On the other hand, when a CBR of the carrier does not satisfy the CBR threshold, the UE performs the carrier reselection.

8 Claims, 12 Drawing Sheets

(56) References Cited

U.S. PATENT DOCUMENTS

| | | | |
|---|---|---|---|
| 2019/0208536 A1* | 7/2019 | Li | H04W 16/32 |
| 2019/0215685 A1* | 7/2019 | Wang | H04W 72/02 |
| 2019/0394786 A1* | 12/2019 | Parron | H04L 27/0006 |
| 2020/0029245 A1* | 1/2020 | Khoryaev | H04L 27/0006 |
| 2020/0120685 A1* | 4/2020 | Lee | H04W 4/40 |
| 2020/0196310 A1* | 6/2020 | Tang | H04W 24/00 |
| 2020/0221467 A1* | 7/2020 | Huang | H04W 72/085 |
| 2020/0229194 A1* | 7/2020 | Belleschi | H04L 5/0064 |
| 2020/0245327 A1* | 7/2020 | Tang | H04W 72/10 |
| 2020/0383094 A1* | 12/2020 | Chae | H04W 4/40 |

OTHER PUBLICATIONS

Intel Corporation, "Carrier Selection for CA over PC5," R2-1710651, 3GPP TSG RAN WG2 Meeting #99bis, Prague, Czech Republic, dated Oct. 9-13, 2017, 5 pages.

Catt, "carrier selection in eV2X," R2-1710714, 3GPP TSG-RAN WG2 #99bis, Prague, Czech Republic, dated Oct. 9-13, 2017, 5 pages.

Ericsson, "Sidelink Carrier Selection Criteria," R2-1711493, 3GPP TSG-RAN WG2 #99bis, Prague, Czech Republic, dated Oct. 9-13, 2017, 8 pages.

Catt, "Multi-Carrier Operation for Sidelink V2X," R2-168109, 3GPP TSG-RAN WG2 Meeting #96, Reno, USA, Nov. 14-18, 2016, 4 pages.

Extended European Search Report in European Appln. No. 18865034.5, dated Sep. 25, 2020, 12 pages.

Huawei, HiSilicon, "Discussion on the Tx carrier selection for PCS CA," R2-1710085, 3GPP TSG-RAN WG2 Meeting #99bis, Prague, Czech Republic, dated Oct. 9-13, 2017, 6 pages.

LG Electronics Inc., "Consideration of carrier reselection," R2-1802920, 3GPP TSG-RAN WG2 Meeting #101, Athens, Greece, Feb. 26-Mar. 2, 2018, 3 pages.

* cited by examiner

METHOD AND APPARATUS FOR SUPPORTING CARRIER RESELECTION BASED ON CHANNEL BUSY RATIO IN WIRELESS COMMUNICATION SYSTEM

CROSS-REFERENCE TO RELATED APPLICATIONS

Pursuant to 35 U.S.C. § 119(e), this application is a continuation of International Application PCT/KR2018/011770, with an international filing date of Oct. 5, 2018, which claims the benefit of U.S. Provisional Application No. 62/568,801 filed on Oct. 6, 2017, the contents of which are all hereby incorporated by reference herein in their entirety.

TECHNICAL FIELD

The present invention relates to wireless communications, and more particularly, to a method and apparatus for supporting carrier reselection based on a channel busy ratio (CBR) in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

SUMMARY

Carrier aggregation (CA) in sidelink for V2X sidelink communication may be supported. For actual transmission, a carrier may be selected among aggregated carriers for V2X sidelink communication. The carrier may be initially selected or re-selected. A method for performing the carrier reselection may be required.

In an aspect, a method for operating a user equipment (UE) in a wireless communication system is provided. The method includes selecting a carrier among a plurality of carriers, receiving information on a channel busy ratio (CBR) threshold from a network, triggering a carrier reselection, when a CBR of the carrier satisfies the CBR threshold, keeping using the carrier, and when a CBR of the carrier does not satisfy the CBR threshold, performing the carrier reselection.

In another aspect, a user equipment (UE) in a wireless communication system is provided. The UE includes a memory, a transceiver, and a processor, operably coupled to the memory and the transceiver, that selects a carrier among a plurality of carriers, controls the transceiver to receive information on a channel busy ratio (CBR) threshold from a network, triggers a carrier reselection, when a CBR of the carrier satisfies the CBR threshold, keeps using the carrier, and when a CBR of the carrier does not satisfy the CBR threshold, performs the carrier reselection.

Unnecessary carrier reselection can be avoided.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
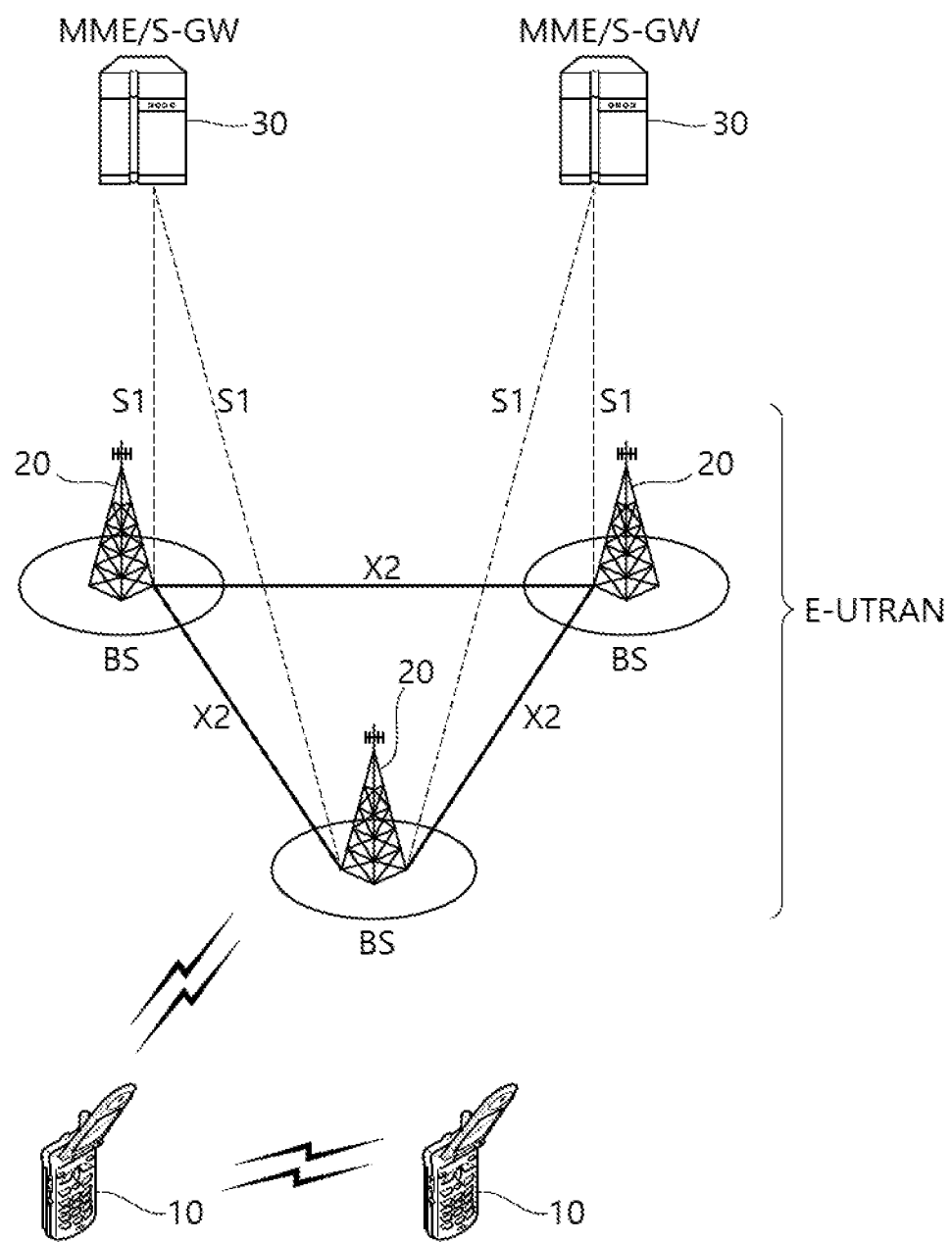
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
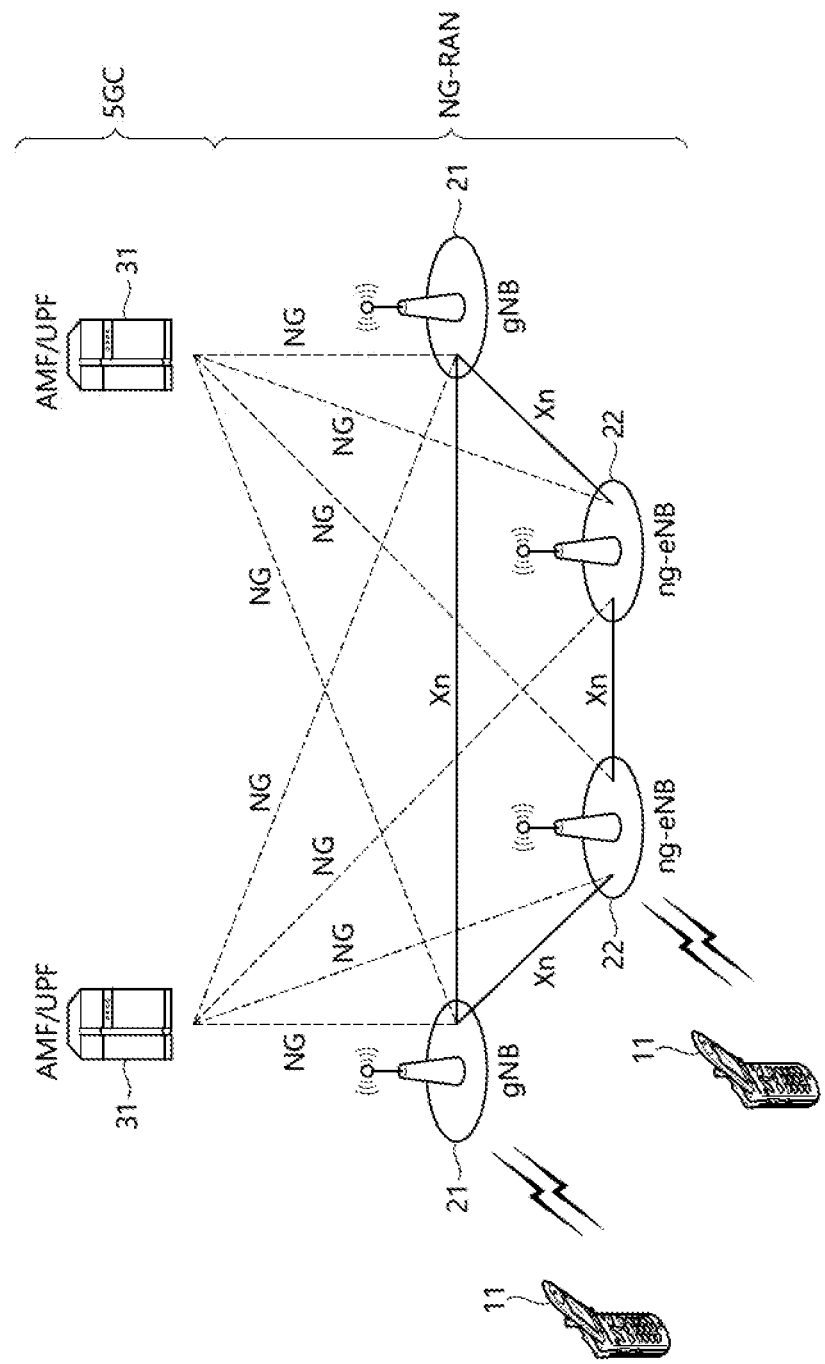
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
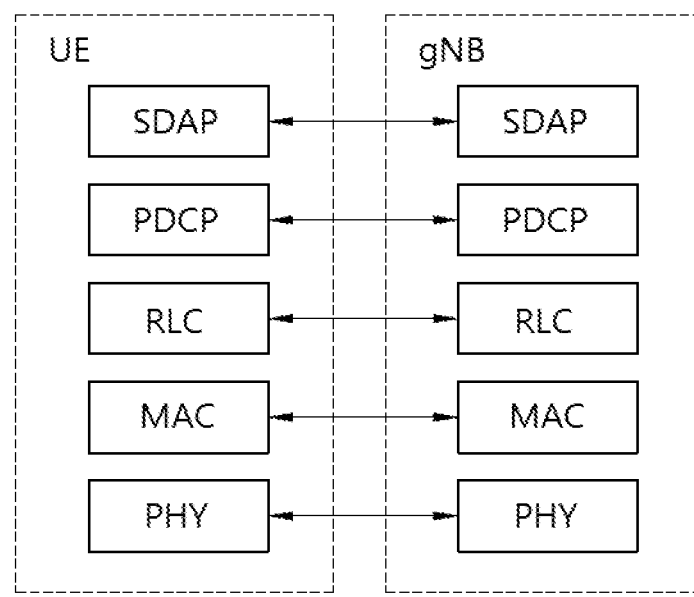
FIG. 3 shows a block diagram of a user plane protocol stack to which technical features of the present invention can be applied.
Figure 4:
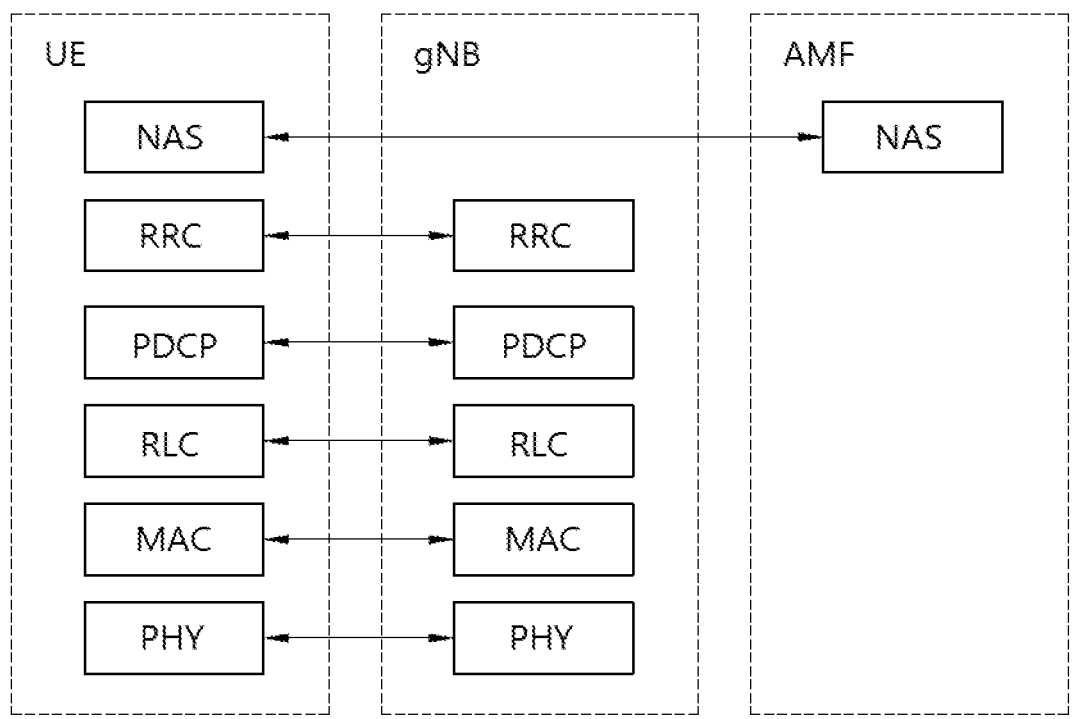
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers.

The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink is described. Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

A UE is considered in-coverage for sidelink communication whenever it detects a cell on a public safety ProSe carrier. If the UE is out of coverage for sidelink communication, it can only use the Mode 2. If the UE is in coverage for sidelink communication, it may use the Mode 1 or the Mode 2 as per BS configuration. If the UE is in coverage for sidelink communication, it shall use only the resource allocation mode indicated by BS configuration, unless one of the exceptional cases occurs. When an exceptional case occurs, the UE is allowed to use the Mode 2 temporarily, even though it was configured to use the Mode 1. Resource pool to be used during exceptional case may be provided by BS.

A set of transmission and reception resource pools for SCI when the UE is out of coverage for sidelink communication is pre-configured in the UE. The resource pools for SCI when the UE is in coverage for sidelink communication are configured as follows. The resource pools used for reception are configured by the BS via RRC, in broadcast signaling. The resource pool used for transmission is configured by the BS via RRC, in dedicated or broadcast signaling, if the Mode 2 is used. The resource pool used for transmission is configured by the BS via RRC, in dedicated signaling if the Mode 1 is used. In this case, the BS schedules the specific resource(s) for SCI transmission within the configured reception pools.

A set of transmission and reception resource pools for data when the UE is out of coverage for sidelink communication is pre-configured in the UE. The resource pools for data when the UE is in coverage for sidelink communication are configured as follows. The resource pools used for transmission and reception are configured by the BS via RRC, in dedicated or broadcast signaling, if the Mode 2 is used. There is no resource pool for transmission and reception if the Mode 1 is used.

V2X services and V2X sidelink communication is described. V2X services can consist of the following four different types, i.e. vehicle-to-vehicle (V2V), vehicle-to-infrastructure (V2I), vehicle-to-nomadic (V2N) and vehicle-to-pedestrian (V2P). V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE may be in either RRC_CONNECTED or RRC_IDLE in order to perform V2X communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re)selects some specific sidelink resources and reserves multiple sidelink resources. Up to 2 parallel independent resource reservation processes per each carrier are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed, as long as either synchronization is performed with the target cell in case BS is configured as synchronization source or synchronization is performed with global navigation satellite system (GNSS) in case GNSS is configured as synchronization source. If the exceptional transmission resource pool is included in the handover command, the UE starts using randomly selected resources from the exceptional transmission resource pool starting from the reception of handover command. If the UE is configured with the Mode 3 in the handover command, the UE continues to use the exceptional transmission resource pool while the timer associated with handover is running. If the UE is configured with the Mode 4 in the target cell, the UE continues to use the exceptional transmission resource pool until the sensing results on the transmission resource pools for the Mode 4 are available. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for the Mode 4 are available.

In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier. If the UE that is authorized for V2X sidelink communication is in-coverage for V2X sidelink communication, it may use the Mode 3 or the Mode 4 as per BS configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

For sidelink SPS, maximum 8 SPS configurations with different parameters can be configured by BS and all SPS configurations can be active at the same time. The activation/deactivation of SPS configuration is signaled via PDCCH by BS. The existing logical channel prioritization based on PPPP is used for sidelink SPS.

UE assistance information can be provided to BS. Reporting of UE assistance information is configured by BS for V2X sidelink communication. The UE assistance information used for V2X sidelink communication includes traffic characteristic parameters (e.g. a set of preferred expected SPS interval, timing offset with respect to subframe 0 of the system frame number (SFN) 0, PPPP and maximum transport block (TB) size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

For controlling channel utilization, the network is able to indicate how the UE adapts its transmission parameters for each transmission pool depending on the channel busy ratio (CBR). The UE measures all the configured transmission pools including exceptional pool. Only data pool is measured for the case scheduling assignment (SA) pool and data pool resources are located adjacently, while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of physical sidelink shared channel (PSSCH) resource block number, range of MCS, maximum limit on channel occupancy ratio. The transmission parameter adaptation applies to all transmission pools including exceptional pool.

Sidelink transmission and/or reception resources including exceptional pool for different frequencies for the Mode 3 and Mode 4 may be provided. The sidelink resources for different frequencies can be provided via dedicated signaling, SIB21 and/or pre-configuration. The serving cell may indicate to the UE only the frequency on which the UE may acquire the sidelink resource configuration. If multiple frequencies and associated resource information are provided, it is up to UE implementation to select the frequency among the provided frequencies. The UE shall not use pre-configured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre) configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

Before Rel-14, a resource pool is configured only on a single carrier. That is, the UE chooses a single transmission carrier to perform sidelink transmission and re-transmission. The RRC layer of the UE (hereinafter, simply UE RRC) selects a resource pool on a single carrier. Then, the MAC layer of the UE (hereinafter, simply UE MAC) performs resource (re-)selection on the selected pool, and performs sidelink transmission by using the selected resource.

In Rel-15, it has been discussed to introduce carrier aggregation (CA) in sidelink for V2X sidelink communication. CA in sidelink for V2X sidelink communication may apply to both in coverage UEs and out of coverage UEs. In CA in sidelink for V2X sidelink communication, each resource pool (pre)configured for V2X sidelink communication transmission or reception may be associated to a single carrier.

If CA in sidelink for V2X sidelink communication is introduced, the UE may perform parallel transmissions on different carriers. The UE can select multiple transmission carriers and perform carrier reselection. The UE may select resources on each carrier/resource pool independently.

Specifically, it has been agreed that up to 8 PC5 carriers can be aggregated per UE for V2X sidelink communication. In addition, appropriate carriers may be selected for transmission. The initial transmission carrier selection may be performed considering carrier's condition. Specifically, UE MAC (or UE RRC) may select a set of candidate carrier(s) based on measured CBR level and/or associated PPPP of MAC PDU. According to the conditions of configured carriers and generated packets, one carrier or multiple carriers may be selected. When the set of candidate carriers are selected, final carrier (or carriers) may be selected based on the lowest CBR among the set of candidate carriers.

Figure 5:
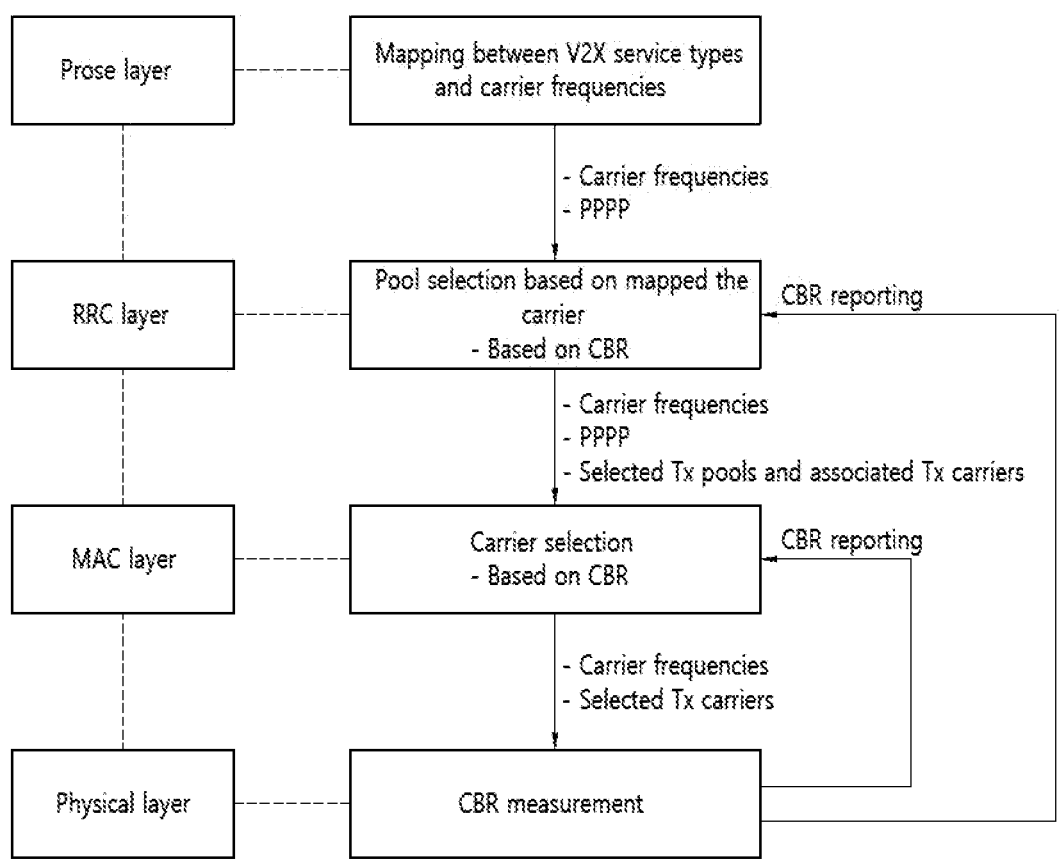
FIG. 5 show layer design for transmission carrier selection for V2X sidelink communication according to an embodiment of the present invention.

FIG. 5 show layer design for transmission carrier selection for V2X sidelink communication according to an embodiment of the present invention. In FIG. 5, detailed functions/operations of each layer and/or information which needs to be transported between layers to perform transmission carrier selection for V2X sidelink communication reception are described.

(1) ProSe Layer (i.e. Application Layer)

For a case where multiple frequencies for V2X sidelink communication (i.e. V2X frequencies) are supported, mapping between V2X service types and V2X frequencies is configured by the ProSe layer. The UE should ensure a service to be transmitted on the corresponding V2X frequency. In addition, there may be one or more V2X frequencies associated with the V2X service identifier of the V2X service for the V2X message in the current geographical area. The ProSe layer may pass the one or more V2X frequencies associated with the V2X service identifier of the V2X service for the V2X message to the lower layers.

The AS layer, i.e. RRC layer, is provided with the PPPP of a protocol data unit (PDU) transmitted over PC5 interface by ProSe layer. The packet delay budget (PDB) of the PDU may be determined from the PPPP.

In summary, carrier frequencies associated V2X service and PDU with PPPP may be configured by ProSe layer.

(2) RRC Layer

Currently, CBR is known to the RRC layer for, e.g. transmission parameter adaption. Thus, the pool selection is performed by the RRC layer based on the located zone in V2X communication. To perform the pool selection, associated carrier (i.e. concerned frequency) with the pool should also be selected/configured. Association between pool(s) and carrier(s) may be one-to-one or many-to-one or one-to-many or many-to-many. Therefore, the pool selection by the RRC layer also requires to perform carrier selection. CBR is necessary to perform the carrier selection. That is, CBR is a criteria to perform the carrier selection. Therefore, measured CBR of the configured carrier is necessary to perform the pool associated carrier selection by the RRC layer.

In summary, the RRC layer selects the frequencies among the candidate frequencies based on CBR.

(3) MAC Layer

Currently, transmission of MAC PDU via available resource is performed by the MAC layer. While the available pools associated carriers are configured by the RRC layer, the MAC layer needs to select suitable carrier(s) based on the configured pools for multiple MAC PDU transmission. CBR may be necessary to select the transmission carrier for actual transmission of MAC PDU. Hence, measured CBR for the configured carriers may be necessary to be known to the MAC layer for the transmission carrier selection associated with pool(s). Such the measured CBR may be received either from the RRC layer or the physical layer. If the measured CBR is not available at the UE, the UE may utilize the default CBR value associated with pool provided by the network.

In summary, the MAC layer selects the frequencies among the candidate frequencies configured by the RRC layer based on measured CBR or default CBR value configured by the network.

(4) Physical Layer

The physical layer measures CBR for each carrier, and reports the measured CBR to the RRC layer and/or the MAC layer.

After transmission carrier is selected, data transmission will be performed based on the selected transmission carrier. While transmitting data based on the selected transmission carrier, a condition of carrier may be monitored based on measured CBR. If measured CBR of the selected transmission carrier becomes worse, i.e. CBR increases, it is natural that carrier reselection can be considered, since performance of transmission based on the selected transmission carrier may be degraded due to congestion on the selected transmission carrier. That is, if CBR of the selected transmission carrier becomes worse, it seems to be beneficial to change a transmission carrier (i.e. transmission carrier reselection).

The transmission carrier reselection may be triggered by sidelink resource reselection. When the sidelink resource reselection is triggered according to various conditions, a UE may clear the configured sidelink resources in order to reselect another sidelink resource. Likewise, the various conditions for the sidelink resource reselection may be used for conditions for the transmission carrier reselection. That is, the sidelink resource reselection may lead to the transmission carrier reselection.

However, some problems may occur to consider conditions for the sidelink resource reselection as conditions for the transmission carrier reselection as follows.

The number of conditions for the sidelink resource reselection may be up to 8, which is too many for the transmission carrier reselection.

Even though the CBR is a criteria to perform the transmission carrier selection and measured CBR of the configured carrier is necessary to perform the pool associated carrier selection, CBR is not considered for conditions for the sidelink resource reselection.

It is not desirable if a UE changes its selected transmission carrier whenever the sidelink resource reselection is triggered. That is, overhead may occur to switch transmission chain for tuning on the switching carrier whenever performing transmission carrier reselection.

If many proximity UEs perform the transmission carrier selection around the same time, the CBR of a certain carrier may increase sharply due to multiple transmission carrier selection by the many proximity UEs. This may result in experiencing poor quality of the service (QoS) in the selected carrier.

Even though the CBR of the current selected carrier is low, whenever the sidelink resource reselection is triggered by satisfying conditions for the sidelink resource reselection, the transmission carrier reselection may be performed, which lead to overhead.

Hereinafter, a method for supporting carrier reselection based on CBR according to embodiments of the present invention is described. According to an embodiment of the present invention, CBR may be considered for the transmission carrier reselection as well as the initial transmission carrier selection. Furthermore, in order to avoid the problem described above, it may be beneficial not to perform the transmission carrier reselection in some cases even when the sidelink resource reselection criteria are met.

Figure 6:
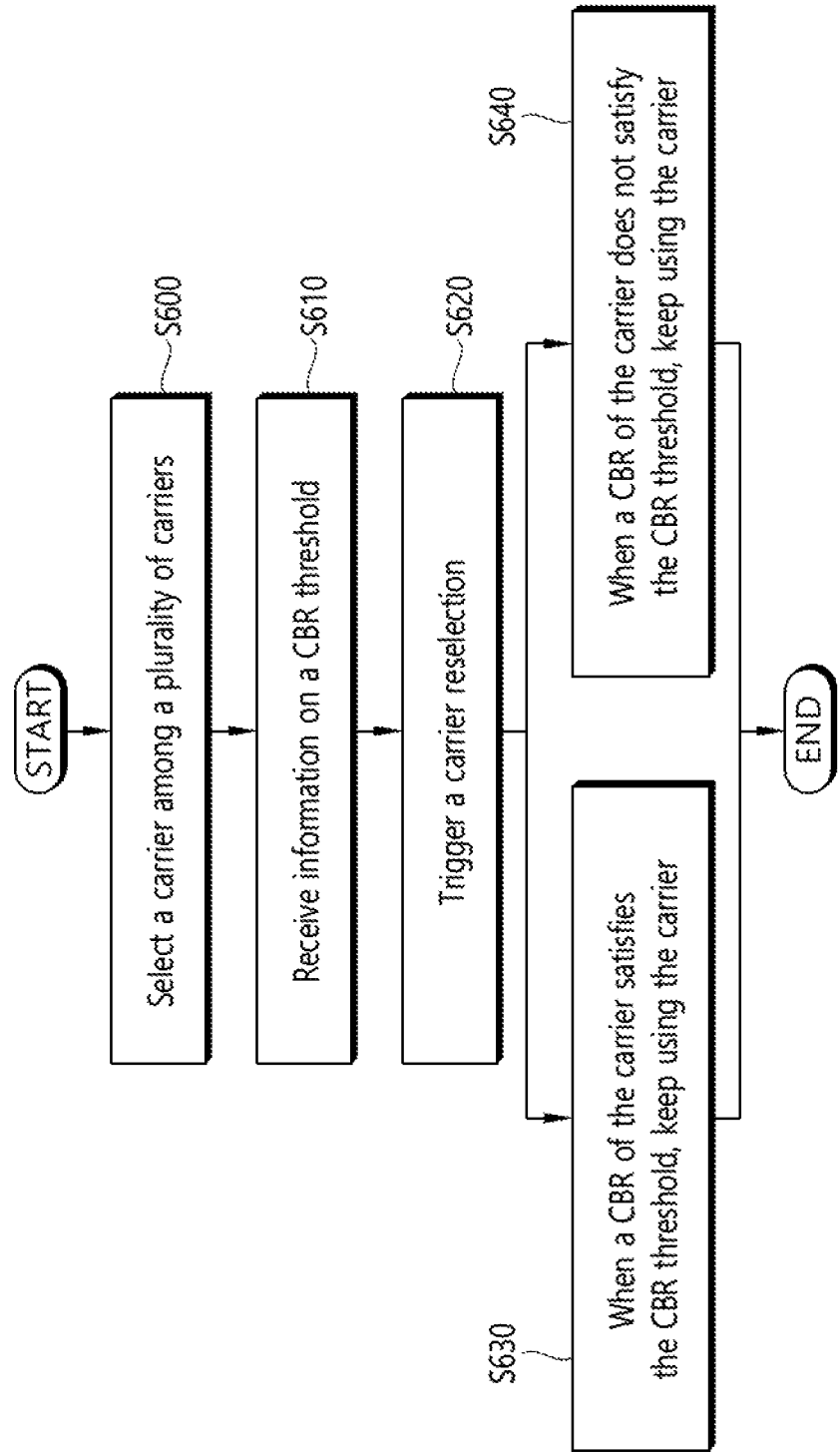
FIG. 6 shows a method for supporting carrier reselection by a UE according to an embodiment of the present invention.

FIG. 6 shows a method for supporting carrier reselection by a UE according to an embodiment of the present invention. In this embodiment, it is assumed that N number of carriers are selected and currently used by UE MAC. Specifically, the physical layer of the UE (hereinafter, simply UE PHY) measures CBR for all configured carriers, and reports the measured CBR for each configured carrier to UE RRC and/or UE MAC. The measured CBR for each configured carrier may be reported periodically or based on event. UE RRC selects pool(s) associated carriers which is configured from upper layer. The pool(s) associated carriers may be a set of candidate carriers used for transmission.

In step S600, the UE selects a carrier among a plurality of carriers (i.e. initial carrier selection). Specifically, the UE MAC may select the carrier among the plurality of carriers based on CBR threshold. If CBR of each associated carrier is lower than the CBR threshold, the each associated carrier may be selected for a candidate carrier. The set of candidate carriers may be ordered based on measured/signaled CBR. Among the set of candidate carriers, N number of carriers may be selected with lowest CBR.

Information on the CBR threshold may be received by the UE RRC from the network. Alternatively, the CBR threshold may be preconfigured or fixed in the specification. The CBR threshold may be configured per associated carrier. The CBR threshold in step S600 may be used only for the initial carrier selection.

In step S610, the UE receives information on a CBR threshold from the network. Specifically, the UE RRC may receive information on CBR threshold used for carrier reselection from the network. The CBR threshold for the carrier reselection may be different from the CBR threshold for the initial carrier selection. That is, the CBR threshold in step S610 may be used only for the carrier reselection. The CBR threshold for the carrier reselection may be higher than the CBR threshold for the initial carrier selection. Alternatively, the CBR threshold may be preconfigured or fixed in the specification. The CBR threshold may be configured per associated carrier.

In step S620, the UE triggers the carrier reselection. Specifically, the UE MAC may trigger the carrier reselection based on CBR and CBR threshold for the carrier reselection. The UE may determine whether to perform the carrier reselection based on CBR of the carrier and the CBR threshold for the carrier reselection.

In step S630, when a CBR of the carrier satisfies the CBR threshold, the UE keeps using the carrier. Specifically, when the CBR of the carrier satisfies the CBR threshold, the UE MAC may not perform the carrier reselection. The CBR of the carrier may satisfy the CBR threshold when the CBR of the carrier is below than the CBR threshold. That is, when the CBR of the carrier is below than the CBR threshold for the carrier reselection, the UE may not perform the carrier reselection, even though the carrier reselection is trigger due to the sidelink resource reselection.

On the other hand, in step S640, when a CBR of the carrier does not satisfy the CBR threshold, the UE performs the carrier reselection. Specifically, the CBR of the carrier may not satisfy the CBR threshold when the CBR of the carrier is not below than (i.e. equal to or above than) the CBR threshold.

Figure 7:
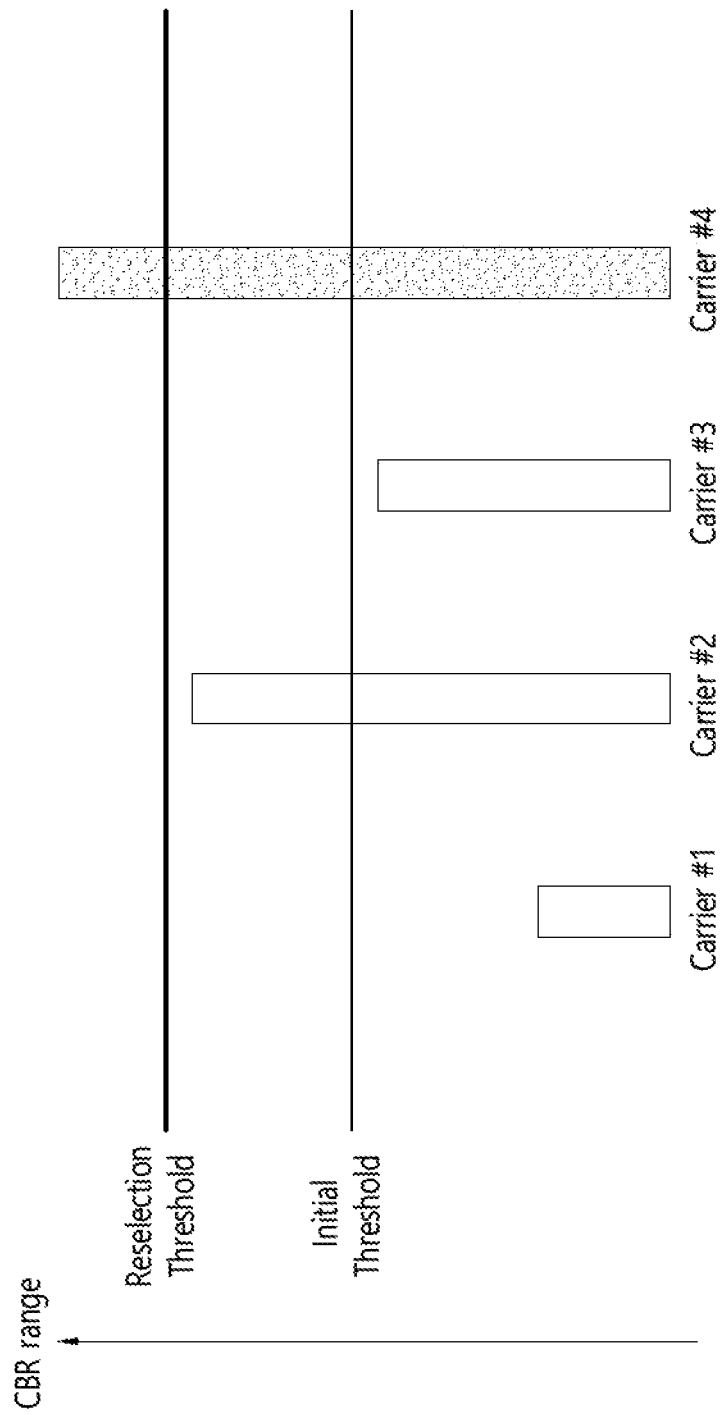
FIG. 7 shows an example of carrier reselection according to an embodiment of the present invention.

FIG. 7 shows an example of carrier reselection according to an embodiment of the present invention. All carriers (i.e. carrier #1 to carrier #4) are selected as candidate carriers by the initial carrier selection, because CBR of all carriers is below than the initial threshold at the time of the initial carrier selection.

Referring to FIG. 7, as time goes by, CBR of each carrier changes. If carrier #1/#2/#3 is a carrier selected by the initial carrier selection, the carrier reselection is not performed because the CBR of carrier #1/#2/#3 is below than the CBR threshold for the carrier reselection, i.e. reselection threshold. On the other hand, if carrier #4 is a carrier selected by the initial carrier selection, the carrier reselection is performed because the CBR of carrier #4 is above than the CBR threshold for the carrier reselection.

Furthermore, information on a hysteresis may be received from the network. The information on the hysteresis may be received together with the information on the CBR threshold in step S610 described above. Alternatively, the hysteresis may be preconfigured or fixed in the specification. The hysteresis may be configured per associated carrier.

If the information on the hysteresis is received from the network and/or the hysteresis is preconfigured or fixed in the specification, in step S620 described above, the UE MAC may trigger the carrier reselection based on CBR, CBR threshold for the carrier reselection, and the hysteresis. The UE may determine whether to perform the carrier reselection based on CBR of the carrier, the CBR threshold for the carrier reselection, and the hysteresis.

More specifically, in step S630 described above, the CBR of the carrier may satisfy the CBR threshold when the CBR of the carrier is below than the CBR threshold plus the hysteresis and above than the CBR threshold minus the hysteresis. That is, when the CBR of the carrier is within a range of [CBR threshold−hysteresis, CBR threshold+hysteresis], the UE may not perform the carrier reselection, even though the carrier reselection is trigger due to the sidelink resource reselection. By considering the hysteresis for the carrier reselection, frequent ping-pong problem can be avoided.

On the other hand, in step S640 described above, the CBR of the carrier may not satisfy the CBR threshold when the CBR of the carrier is not below than (i.e. equal to or above than) the CBR threshold plus the hysteresis or not above than (i.e. equal to or below than) the CBR threshold minus the hysteresis. In this case, the carrier reselection may be performed by excluding carriers of which CBR is not below than the CBR threshold plus the hysteresis. Or, the carrier reselection may be performed by including carriers of which CBR is not above than the CBR threshold minus the hysteresis.

Figure 8:
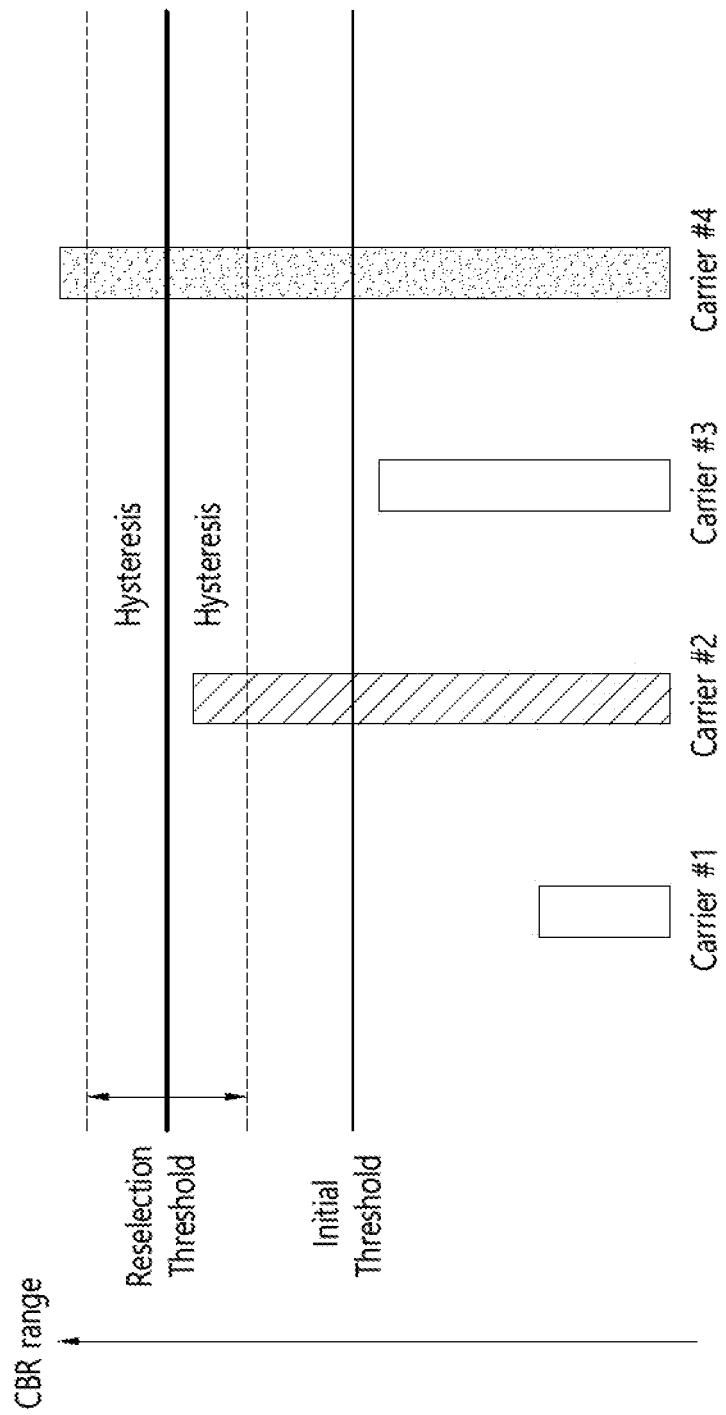
FIG. 8 shows another example of carrier reselection according to an embodiment of the present invention.

FIG. 8 shows another example of carrier reselection according to an embodiment of the present invention. Referring to FIG. 8, because the CBR of carrier #1/#3 is below than [reselection threshold−hysteresis], the carrier reselection may be performed by including carrier #1/#3. Furthermore, because the CBR of carrier #4 is above than [reselection threshold+hysteresis], the carrier reselection may be performed by excluding carrier #4. Meanwhile, if carrier #2 is a carrier selected by the initial carrier selection, the carrier reselection is not performed because the CBR of carrier #2 is within a range of [CBR threshold−hysteresis, CBR threshold+hysteresis].

The detailed operation of the UE MAC according to the embodiment of the present invention is as follows.

The MAC entity shall consider a CBR of a carrier to be one measured by lower layers if CBR measurement results are available, or the corresponding defaultTxConfigIndex configured by upper layers for the carrier if CBR measurement results are not available.

The MAC entity shall:

1> if the MAC entity is configured by upper layers to transmit using pool(s) of resources on one or multiple carriers and data is available in sidelink traffic channel (STCH) (i.e. initial transmission carrier selection):

2> for each sidelink logical channel where data is available:

3> for each carrier associated with the concerned sidelink logical channel:

4> if the CBR of the carrier is below threshCBR-FreqReselection associated with the priority of the sidelink logical channel:

5> consider the carrier as a candidate carrier for transmission carrier (re-) selection for the concerned sidelink logical channel.

1> else if the MAC entity has been configured by upper layers to transmit using pool(s) of resources on one or multiple carriers, and the transmission carrier reselection is triggered for a process associated with a carrier (i.e. transmission carrier reselection):

2> for each sidelink logical channel allowed on the carrier where data is available and transmission carrier (re-)selection is triggered:

3>if the CBR of the carrier is below threshCBR-Freq-Keeping associated with priority of sidelink logical channel:
4>select the carrier and the associated pool of resources;
3>else:
4>for each carrier configured by upper layers, if the CBR of the carrier is below threshCBR-FreqReselection associated with the priority of the sidelink logical channel
5>consider the carrier as a candidate carrier for transmission carrier (re-) selection.

The MAC entity shall:
1>if one or more carriers are considered as the candidate carriers for transmission carrier (re-)selection:
2>for each sidelink logical channel allowed on the carrier where data is available and transmission carrier (re-)selection is triggered, select one or more carrier(s) and associated pool(s) of resources among the candidate carriers with increasing order of CBR from the lowest CBR.

In the detailed operation of the UE MAC described above, the threshCBR-FreqReselection is the information on the CBR threshold, which is received in step S610 of FIG. 6 described above. That is, the threshCBR-FreqReselection indicates the CBR threshold to determine whether the UE can keep using the carrier which was selected for the transmission of V2X sidelink communication. The threshCBR-FreqReselection may be received via SL-V2X-FreqSelectionConfigList information element (IE). The SL-V2X-FreqSelectionConfigList IE specifies the configuration information for carrier selection for V2X sidelink communication transmission using UE autonomous resource selection, i.e. Mode 4.

According to embodiment of the present invention shown in FIGS. 6 to 8, even though the carrier reselection is trigger due to the sidelink resource reselection, the carrier reselection may not be performed by considering the CBR threshold for the carrier reselection. The selected carrier can be used continuously without change of the carrier. Therefore, when CBR of the current selected carrier is low, unnecessary carrier reselection can be avoided. In addition, overhead to switch transmission chain for tuning on the switching carrier whenever performing transmission carrier reselection can be avoided. In addition, it can be avoided that too many proximity UEs perform transmission carrier selection around the same time.

Figure 9:
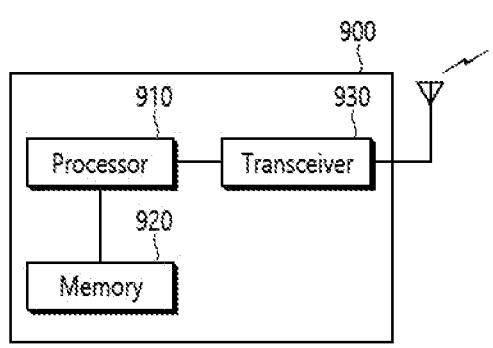
FIG. 9 shows a UE to implement an embodiment of the present invention.

FIG. 9 shows a UE to implement an embodiment of the present invention. The present invention described above for UE side may be applied to this embodiment.

A UE 900 includes a processor 910, a memory 920 and a transceiver 930. The processor 910 may be configured to implement proposed functions, procedures and/or methods described in this description. Layers of the radio interface protocol may be implemented in the processor 910. Specifically, the processor 910 selects a carrier among a plurality of carriers, controls the transceiver 930 to receive information on a CBR threshold from a network, and triggers a carrier reselection. When a CBR of the carrier satisfies the CBR threshold, the processor 910 keeps using the carrier. When a CBR of the carrier does not satisfy the CBR threshold, the processor 910 performs the carrier reselection.

The carrier reselection is not performed when the CBR of the carrier satisfies the CBR threshold. The CBR of the carrier may satisfy the CBR threshold when the CBR of the carrier is below than the CBR threshold. The CBR of the carrier may not satisfy the CBR threshold when the CBR of the carrier is not below than the CBR threshold. The information on the CBR threshold may be configured per each of the plurality of carriers.

Furthermore, the processor 910 may further control the transceiver 930 to receive information on a hysteresis from the network. The CBR of the carrier may satisfy the CBR threshold when the CBR of the carrier is below than the CBR threshold plus the hysteresis and above than the CBR threshold minus the hysteresis. The CBR of the carrier may not satisfy the CBR threshold when the CBR of the carrier is not below than the CBR threshold plus the hysteresis or not above than the CBR threshold minus the hysteresis. The carrier reselection may be performed by excluding carriers of which CBR is not below than the CBR threshold plus the hysteresis. The carrier reselection may be performed by including carriers of which CBR is not above than the CBR threshold minus the hysteresis.

The memory 920 is operatively coupled with the processor 910 and stores a variety of information to operate the processor 910. The transceiver 920 is operatively coupled with the processor 910, and transmits and/or receives a radio signal.

The processors 910 may include application-specific integrated circuit (ASIC), other chipset, logic circuit and/or data processing device. The memories 920 may include read-only memory (ROM), random access memory (RAM), flash memory, memory card, storage medium and/or other storage device. The transceivers 930 may include baseband circuitry to process radio frequency signals. When the embodiments are implemented in software, the techniques described herein can be implemented with modules (e.g., procedures, functions, and so on) that perform the functions described herein. The modules can be stored in memories 920 and executed by processors 910. The memories 920 can be implemented within the processors 910 or external to the processors 910 in which case those can be communicatively coupled to the processors 910 via various means as is known in the art.

According to embodiment of the present invention shown in FIG. 9, even though the carrier reselection is trigger due to the sidelink resource reselection, the carrier reselection may not be performed by considering the CBR threshold for the carrier reselection. The selected carrier can be used continuously without change of the carrier. Therefore, when CBR of the current selected carrier is low, unnecessary carrier reselection can be avoided. In addition, overhead to switch transmission chain for tuning on the switching carrier whenever performing transmission carrier reselection can be avoided. In addition, it can be avoided that too many proximity UEs perform transmission carrier selection around the same time.

Figure 10:
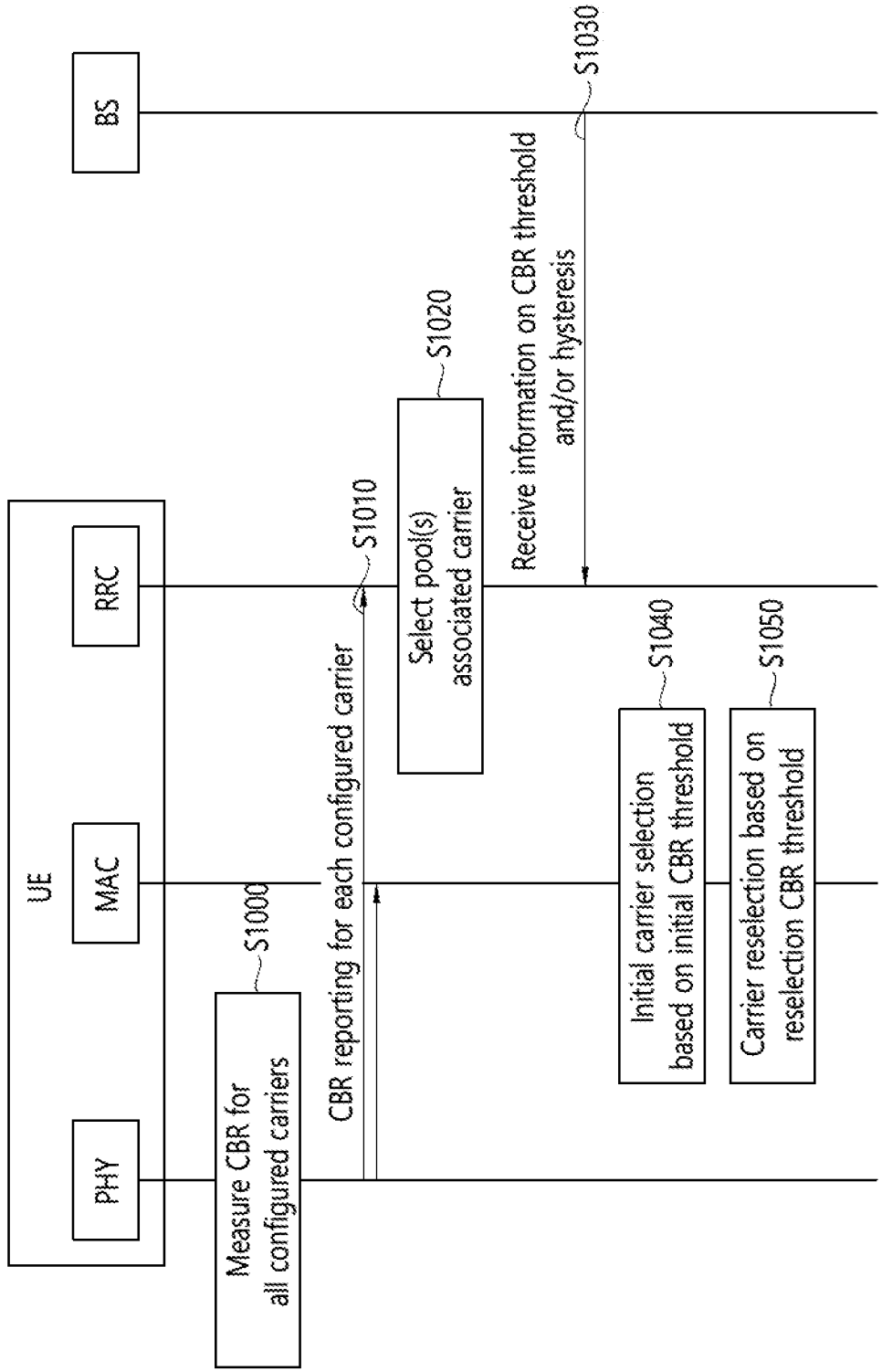
FIG. 10 shows a method for supporting carrier reselection by a UE according to another embodiment of the present invention.

FIG. 10 shows a method for supporting carrier reselection by a UE according to another embodiment of the present invention.

In step S1000, the UE PHY measures CBR for all configured carriers.

In step S1010, the UE PHY reports the measured CBR for each configured carrier to the UE RRC and/or the UE MAC. The measured CBR for each configured carrier may be reported periodically and/or based on event.

In step S1020, the UE RRC selects pool(s) associated carriers. The pool(s) associated carriers may be configured by the upper layer, i.e. ProSe layer. The pool(s) associated carriers may be a set of candidate carriers used for transmission.

In step S1030, the UE RRC receives information on CBR threshold from the network. The information on CBR threshold may include information on initial CBR threshold and/or information on reselection CBR threshold. The UE RRC may further receive information on hysteresis from the network. Alternatively, the CBR threshold and/or hysteresis may be preconfigured or fixed in the specification. The CBR threshold and/or hysteresis may be configured per associated carrier.

In step S1040, the UE MAC performs the initial carrier selection based on the initial CBR threshold. If CBR of each associated carrier is lower than the initial CBR threshold, the each associated carriers may be selected for a candidate carrier. The set of candidate carriers may be ordered based on measured/signaled CBR. Among the set of candidate carriers, N number of carriers may be selected with lowest CBR.

In step S1050, the UE MAC performs the carrier reselection based on the reselection CBR threshold. The UE MAC may perform the carrier reselection based on the reselection CBR threshold based on at least one of the following options described below.

(1) The carrier reselection is performed when a condition satisfies. Specifically, among the N candidate carriers, if M carrier(s) of the CBR is higher than the reselection CBR threshold+hysteresis value, then the UE may excludes the M carrier(s) from the candidate carriers and maintains other N-M candidate carriers. Among the associated carriers, the UE may reselect M candidate carriers from lowest CBR. In addition, K associated carrier(s) of the CBR is lower than the reselection CBR threshold-hysteresis value, then UE may include the K associated carrier(s) as a set of candidate carriers. Among the N candidate carriers, the UE may exclude K carriers from highest CBR. If the condition described above does not satisfy, the carrier reselection is not performed.

(2) The carrier reselection is triggered when at least one of the following conditions is met. When the carrier reselection is triggered, candidate carriers are the currently used carriers.

Among the N candidate carriers, if a carrier of the CBR is higher than the reselection CBR threshold+hysteresis value If the CBR of one of the carriers among the associated carriers except candidate carriers is lower than the reselection CBR threshold-hysteresis value If the carrier reselection is triggered, the UE may select the N carriers in the order of CBR from lowest CBR. If the at least one of the above conditions is not met, the carrier reselection is not triggered/performed.

Figure 11:
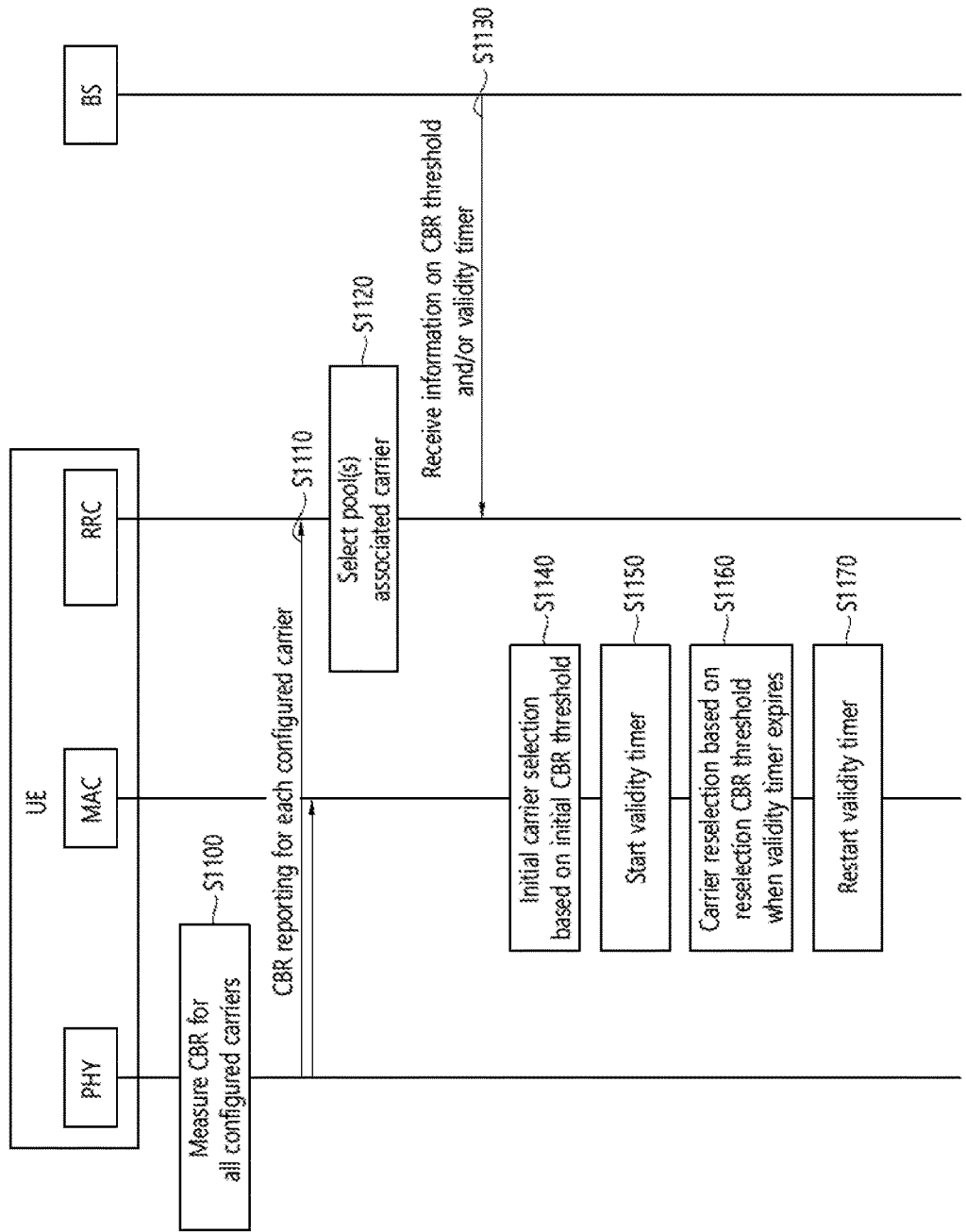
FIG. 11 shows a method for supporting carrier reselection by a UE according to another embodiment of the present invention.

FIG. 11 shows a method for supporting carrier reselection by a UE according to another embodiment of the present invention.

In step S1100, the UE PHY measures CBR for all configured carriers.

In step S1110, the UE PHY reports the measured CBR for each configured carrier to the UE RRC and/or the UE MAC. The measured CBR for each configured carrier may be reported periodically and/or based on event.

In step S1120, the UE RRC selects pool(s) associated carriers. The pool(s) associated carriers may be configured by the upper layer, i.e. ProSe layer. The pool(s) associated carriers may be a set of candidate carriers used for transmission.

In step S1130, the UE RRC receives information on CBR threshold from the network. The information on CBR threshold may include information on initial CBR threshold and/or information on reselection CBR threshold. The UE RRC may further receive information on a validity timer from the network. Alternatively, the CBR threshold and/or validity timer may be preconfigured or fixed in the specification. The CBR threshold and/or validity timer may be configured per UE.

In step S1140, the UE MAC performs the initial carrier selection based on the initial CBR threshold. If CBR of each associated carrier is lower than the initial CBR threshold, the each associated carriers may be selected for a candidate carrier. The set of candidate carriers may be ordered based on measured/signaled CBR. Among the set of candidate carriers, N number of carriers may be selected with lowest CBR.

In step S1150, the UE MAC starts the validity timer.

In step 1160, the UE MAC performs the carrier reselection based on the reselection CBR threshold, only when the validity timer expires. Specifically, when then validity times expires, the UE may reset all configured N candidate carriers. Based on the latest CBR reporting, the UE may reselect the N carriers in the order of CBR from lowest CBR values. Or, the UE may reselect the N carriers based on the method described in step S1050 of FIG. 10.

In step S1170, the UE MAC restarts the validity timer.

Figure 12:
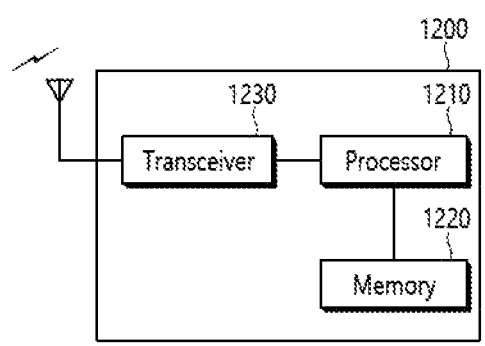
FIG. 12 shows a BS to implement an embodiment of the present invention.

FIG. 12 shows a BS to implement an embodiment of the present invention. The present invention described above for BS side may be applied to this embodiment.

A UE 1200 includes a processor 1210, a memory 1220 and a transceiver 1230. The processor 1210 may be configured to implement proposed functions, procedures and/or methods described in this description. Layers of the radio interface protocol may be implemented in the processor 1210. Specifically, the processor 1210 controls the transceiver 1230 to transmit information on a CBR threshold to a UE.

The memory 1220 is operatively coupled with the processor 1210 and stores a variety of information to operate the processor 1210. The transceiver 1220 is operatively coupled with the processor 1210, and transmits and/or receives a radio signal.

The processors 1210 may include ASIC, other chipset, logic circuit and/or data processing device. The memories 1220 may include ROM, RAM, flash memory, memory card, storage medium and/or other storage device. The transceivers 1230 may include baseband circuitry to process radio frequency signals. When the embodiments are implemented in software, the techniques described herein can be implemented with modules (e.g., procedures, functions, and so on) that perform the functions described herein. The modules can be stored in memories 1220 and executed by processors 1210. The memories 1220 can be implemented within the processors 1210 or external to the processors 1210 in which case those can be communicatively coupled to the processors 1210 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device operating in a wireless communication system, the method comprising:
   measuring a channel busy ratio (CBR) of a plurality of carriers;
   receiving, from a network, a CBR threshold;
   selecting at least one first carrier among the plurality of carriers based on the CBR threshold, wherein the at least one first carrier is selected in order of CBR values from a lowest CBR value;
   starting a timer; and
   upon expiry of timer, triggering a carrier reselection which comprises:
      resetting the at least one first carrier selected by the initial carrier selection,
      selecting at least one second carrier based on the CBR threshold, wherein the at least one second carrier is selected in order of CBR values from a lowest CBR value, and wherein the at least one second carrier is selected by excluding carriers of which CBR is not below a first value equal to the CBR threshold plus a hysteresis value and/or by including carriers of which CBR is not above a second value equal to the CBR threshold minus the hysteresis value, and
      restarting the timer.

2. The method of claim 1, wherein the carrier reselection is triggered after a resource reselection is triggered.

3. The method of claim 1, wherein the CBR threshold is configured per each of the plurality of carriers.

4. The method of claim 1, wherein the wireless device is in communication with at least one of a mobile device, a network, and/or autonomous vehicles other than the wireless device.

5. A wireless device configured to operate in a wireless communication system, the wireless device comprising:
   at least one transceiver;
   at least one processor; and
   at least one computer memory operably connectable to the at least one processor and storing instructions that, based on being executed by the at least one processor, perform operations comprising:
   measuring a channel busy ratio (CBR) of a plurality of carriers;
   receiving, from a network, a CBR threshold;
   selecting at least one first carrier among the plurality of carriers based on the CBR threshold, wherein the at least one first carrier is selected in order of CBR values from a lowest CBR value;
   starting a timer; and
   upon expiry of timer, triggering a carrier reselection which comprises:
      resetting the at least one first carrier selected by the initial carrier selection,
      selecting at least one second carrier based on the CBR threshold, wherein the at least one second carrier is selected in order of CBR values from a lowest CBR value, and wherein the at least one second carrier is selected by excluding carriers of which CBR is not below a first value equal to the CBR threshold plus a hysteresis value and/or by including carriers of which CBR is not above a second value equal to the CBR threshold minus the hysteresis value, and
      restarting the timer.

6. The wireless device of claim 5, wherein the carrier reselection is performed after a resource reselection is triggered.

7. The wireless device of claim 5, wherein the CBR threshold is configured per each of the plurality of carriers.

8. A wireless device configured to operate in a wireless communication system, the wireless device comprising:
   at least one memory; and
   at least one processor operably coupled to the at least one memory,
   wherein the at least one processor is configured to:
   obtain a channel busy ratio (CBR) threshold;
   select at least one first carrier among a the plurality of carriers based on the CBR threshold, wherein the at least one first carrier is selected in order of CBR values from a lowest CBR value;
   starting a timer;
   upon expiry of timer, triggering a carrier reselection which comprises:
      resetting the at least one first carrier selected by the initial carrier selection;
      selecting at least one second carrier based on the CBR threshold, wherein the at least one second carrier is selected in order of CBR values from a lowest CBR value, and wherein the at least one second carrier is selected by excluding carriers of which CBR is not below a first value equal to the CBR threshold plus a hysteresis value and/or by including carriers of which CBR is not above a second value equal to the CBR threshold minus the hysteresis value; and
      restarting the timer.

* * * * *